US010153466B2

(12) United States Patent
Byun et al.

(10) Patent No.: US 10,153,466 B2
(45) Date of Patent: Dec. 11, 2018

(54) RECHARGEABLE BATTERY (71) Applicant: Samsung SDI Co., Ltd., Yongin-si, Gyeonggi-do (KR)

(72) Inventors: Sang-Won Byun, Yongin-si (KR); Seok-Yoon Yoo, Yongin-si (KR); Kwan Hyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 174 days.

(21) Appl. No.: 15/159,740

(22) Filed: May 19, 2016

(65) Prior Publication Data

US 2017/0062779 A1    Mar. 2, 2017

(30) Foreign Application Priority Data

Aug. 27, 2015    (KR) .................. 10-2015-0121075

(51) Int. Cl.
*H01M 2/04* (2006.01)
*H01M 2/06* (2006.01)
*H01M 2/30* (2006.01)
*H01M 2/08* (2006.01)
H01M 2/02 (2006.01)
H01M 2/26 (2006.01)

(52) U.S. Cl.
CPC .............. *H01M 2/06* (2013.01); *H01M 2/04* (2013.01); *H01M 2/043* (2013.01); *H01M 2/0404* (2013.01); *H01M 2/08* (2013.01); *H01M 2/30* (2013.01); H01M 2/0217 (2013.01); H01M 2/263 (2013.01); H01M 2220/20 (2013.01); H01M 2220/30 (2013.01)

(58) Field of Classification Search
CPC ............ H01M 2/04; H01M 2/06; H01M 2/08; H01M 2/30
See application file for complete search history.

(56) References Cited

U.S. PATENT DOCUMENTS

| 2006/0115727 | A1* | 6/2006 | Kim ....................... H01M 2/08 429/181 |
| 2012/0028112 | A1* | 2/2012 | Kim ....................... H01M 2/30 429/182 |
| 2012/0107675 | A1  | 5/2012 | Kim |

(Continued)

FOREIGN PATENT DOCUMENTS

| EP | 2495784 A2 | 9/2012 |
| KR | 10-1222406 B1 | 1/2013 |
| KR | 10-2014-0094206 | 7/2014 |

OTHER PUBLICATIONS

EPO Extended Search Report dated Sep. 27, 2016, for corresponding European Patent Application No. 16170566.0 (5 pages).

*Primary Examiner* — James Lee
(74) *Attorney, Agent, or Firm* — Lewis Roca Rothgerber Christie LLP (57) ABSTRACT A rechargeable battery includes: a case accommodating an electrode assembly; a cap plate coupled to the case at an opening thereof; an electrode terminal electrically connected to the electrode assembly and on the cap plate; and a top plate between the electrode terminal and the cap plate, wherein the top plate and/or the electrode terminal has a slanted side at a lower side thereof facing the cap plate.

6 Claims, 6 Drawing Sheets

(56) References Cited

U.S. PATENT DOCUMENTS

| | | | |
|---|---|---|---|
| 2013/0004832 A1* | 1/2013 | Kim | H01M 2/08 |
| | | | 429/179 |
| 2013/0177803 A1* | 7/2013 | Kugino | H01M 2/0404 |
| | | | 429/179 |
| 2013/0273418 A1 | 10/2013 | Saito | |
| 2014/0205896 A1 | 7/2014 | Kim | |
| 2014/0308568 A1 | 10/2014 | Kim | |

* cited by examiner

RECHARGEABLE BATTERY

CROSS-REFERENCE TO RELATED APPLICATION

This application claims priority to and the benefit of Korean Patent Application No. 10-2015-0121075, filed in the Korean Intellectual Property Office on Aug. 27, 2015, the contents of which are incorporated herein by reference in their entirety.

BACKGROUND

1. Field

The described technology relates generally to a rechargeable battery.

2. Description of the Related Art

A rechargeable battery is a battery that is designed to be repeatedly charged and discharged, different from a primary battery. A small-capacity rechargeable battery may be used in portable, small-sized electronic device, such as a mobile phone, a notebook computer, and a camcorder, and a large-capacity rechargeable battery may be used as a power supply for driving a motor, such as in a hybrid vehicle or an electric vehicle.

The rechargeable battery may include an electrode assembly which functions to be charged and discharged, a case, and electrode terminals. Respective electrode terminals of a plurality of rechargeable batteries may be connected to each other by a bus bar. The bus bar may be combined to the electrode terminals through welding.

In use, the electrode assembly may swell. The rechargeable batteries may move due to the swelling. Therefore, stress may be applied to a welded portion of the bus bar and the electrode terminal. The welded portion may crack due to the stress, and the connection between the electrode terminal and the bus bar may be damaged.

The above information disclosed in this Background section is for enhancement of understanding of the background of the described technology, and therefore, it may contain information that does not form prior art that is already known to a person of ordinary skill in the art.

SUMMARY

The described technology provides a rechargeable battery which reduces or prevents generation of stress between a bus bar and an electrode terminal when an electrode assembly swells.

An exemplary embodiment provides a rechargeable battery including: a case accommodating an electrode assembly; a cap plate coupled to the case at an opening thereof; an electrode terminal electrically connected to the electrode assembly and on the cap plate; and a top plate between the electrode terminal and the cap plate, wherein the top plate and/or the electrode terminal has a slanted side at a lower side thereof facing the cap plate.

The slanted side may be inclined upward in a direction away from a center of the top plate or the electrode terminal.

The rechargeable battery may further include a compressed and deformed member between the top plate and the electrode terminal or between the top plate and the cap plate.

The compressed and deformed member may comprise conductive rubber, conductive silicone, or lead.

The compressed and deformed member may have a ring shape.

According to exemplary embodiments, when the electrode assembly of the rechargeable battery swells, causing the rechargeable battery to move, the top plate or the cap plate may deform toward the slanted side.

According to an exemplary embodiment, excessive generation of stress between the welded portion of the bus bar and the electrode terminal due to swelling of the electrode assembly may be prevented because the cap plate and the top plate are configured to deform due to an external force.

DETAILED DESCRIPTION

In the following detailed description, certain exemplary embodiments have been shown and described, simply by way of illustration. As those skilled in the art would realize, the described embodiments may be modified in various different ways, all without departing from the spirit or scope of the present invention.

Parts that are unrelated to the description of the exemplary embodiments or are unnecessary for the understanding of the exemplary embodiments may not be shown to make the description more clear, and like reference numerals designate like elements throughout the specification.

Furthermore, detailed description is made as to the constituent elements of the first exemplary embodiment with reference to the relevant drawings, while primarily constituent elements different from those in the first exemplary embodiment are described with respect to the other exemplary embodiments. The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Throughout this specification and the claims that follow, when it is described that an element is "on," "connected to," or "coupled to" another element, the element may be directly "on," "connected," or "coupled" to the other element or may be indirectly "on," "connected," or "coupled" to the other element through a third element. In addition, unless explicitly described to the contrary, the words "include," "comprise" and variations thereof, such as "includes," "including," "comprises," or "comprising," will be understood to imply the inclusion of the stated elements but not the exclusion of any other elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 1:
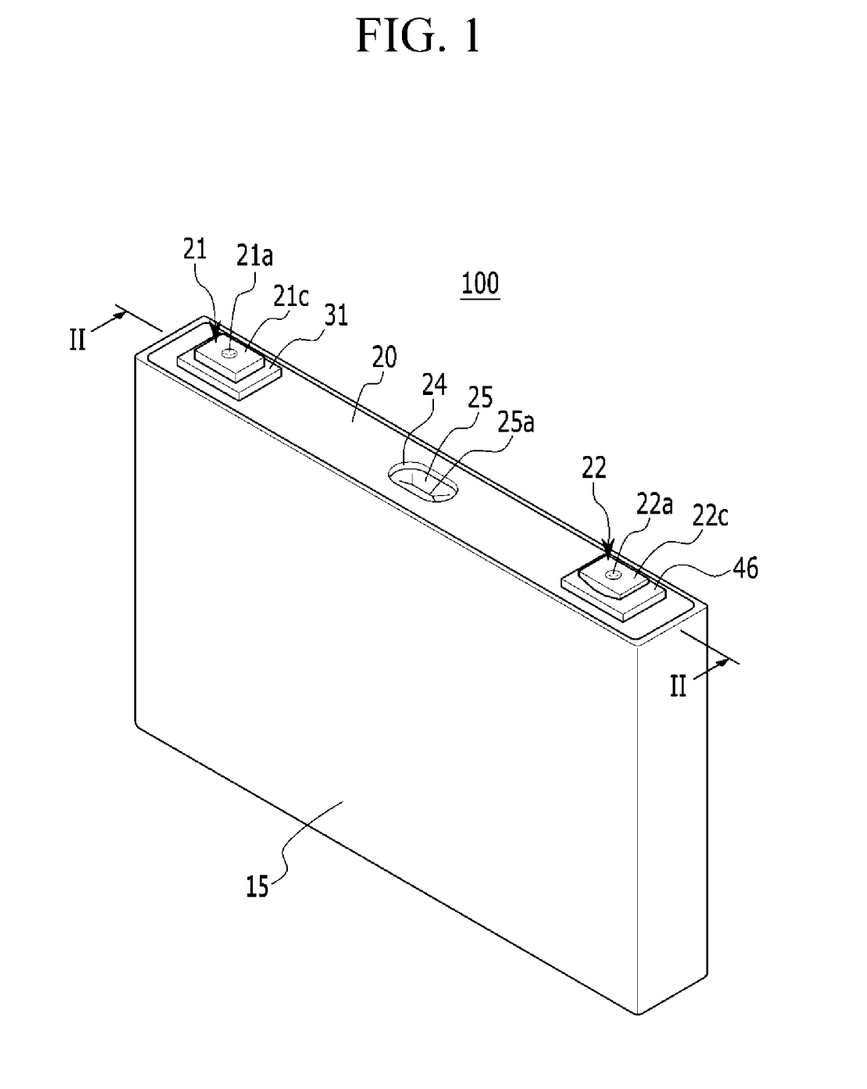
FIG. 1 shows a perspective view of a rechargeable battery according to a first exemplary embodiment.
Figure 2:
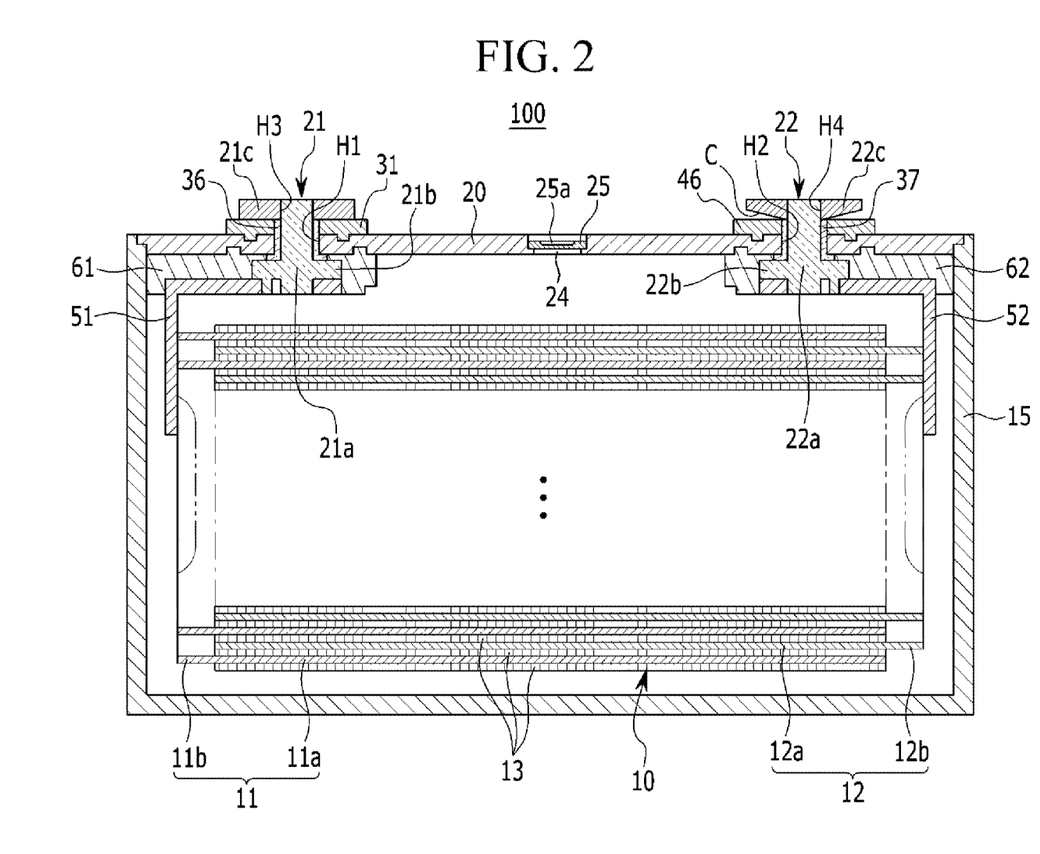
FIG. 2 shows a cross-sectional view with respect to the line II-II of FIG. 1.

FIG. 1 shows a perspective view of a rechargeable battery according to a first exemplary embodiment, and FIG. 2 shows a cross-sectional view with respect to the line II-II of FIG. 1.

Referring to FIG. 1 and FIG. 2, a rechargeable battery 100 includes an electrode assembly 10 for charging and discharging a current, a case 15 for receiving (e.g., for accommodating) the electrode assembly 10 and an electrolyte solution, a cap plate 20 sealing an opening in the case 15, electrode terminals 21 and 22 electrically connected to the electrode assembly 10 and installed in the cap plate 20, and a top plate 46 provided between the electrode terminal 22 and the cap plate 20.

The electrode assembly 10 is formed by disposing electrodes (e.g., a negative electrode 11 and a positive electrode 12) on respective sides of a separator 13 that is an insulator and winding the negative electrode 11, the separator 13, and the positive electrode 12 in a jellyroll shape.

The negative electrode 11 and the positive electrode 12 respectively include coated regions 11a and 12a formed by coating an active material on a current collector, such as a metal plate, and uncoated regions 11b and 12b on which the active material is not coated such that the uncoated regions are exposed regions of the respective current collectors.

The uncoated region 11b of the negative electrode 11 is at one end of the negative electrode 11 along the spirally wound negative electrode 11. The uncoated region 12b of the positive electrode 12 is at one end of the positive electrode 12 along the spirally wound positive electrode 12. The uncoated regions 11b and 12b are disposed at opposite ends of the electrode assembly 10.

The case 15 is formed to be substantially cuboidal so as to have an internal space for accommodating the electrode assembly 10. The opening of the case 15 is formed at one side of the cuboid so that the electrode assembly 10 may be inserted into the internal space from the outside.

The cap plate 20 is combined and welded to the case 15 at the opening of the case 15 (e.g., the cap plate 20 is installed in the opening of the case 15) through forcible insertion and thus closes and seals the case 15. For example, the case 15 and the cap plate 20 can be made of aluminum and be welded to each other. For example, the electrode assembly 10 may be inserted into the case 15 and the cap plate 20 may be welded to the case 15 at the opening thereof.

The cap plate 20 includes, for example, terminal openings H1 and H2 (e.g., terminal holes) and a vent opening 24 (e.g., a vent hole). The electrode terminals 21 and 22 are respectively installed in the terminal openings H1 and H2 of the cap plate 20 and are electrically connected to the electrode assembly 10.

For example, the electrode terminals 21 and 22 are respectively electrically connected to the negative electrode 11 and the positive electrode 12 of the electrode assembly 10. Therefore, the electrode assembly 10 may be drawn outside the case 15 through the electrode terminals 21 and 22.

The electrode terminals 21 and 22 respectively include plate terminals 21c and 22c disposed outside the cap plate 20 to respectively correspond to the terminal openings H1 and H2 and rivet terminals 21a and 22a electrically connected to the electrode assembly 10 and passing through the terminal openings H1 and H2 to be fastened to the plate terminals 21c and 22c.

The plate terminals 21c and 22c include openings H3 and H4 (e.g., through-holes). The rivet terminals 21a and 22a pass upwardly through the terminal openings H1 and H2 and are inserted into the openings H3 and H4, respectively. The electrode terminals 21 and 22 further include flanges 21b and 22b integrally formed at and protruding from the rivet terminals 21a and 22a below the cap plate 20, respectively.

On the electrode terminal 21, which is connected to the negative electrode 11, an external insulating member 31 is provided between the plate terminal 21c and the cap plate 20 to electrically insulate the plate terminal 21c from the cap plate 20. Thus, the cap plate 20 maintains an insulated state with the negative electrode 11 (e.g., the cap plate 20 is electrically insulated from the negative electrode 11 of the electrode assembly 10).

The insulating member 31 and the plate terminal 21c are fastened to an upper portion of the rivet terminal 21a by combining the insulating member 31 and the plate terminal 21c to the upper portion of the rivet terminal 21a and riveting or welding the upper portion. The plate terminal 21c is installed outside the cap plate 20 and on the insulating member 31.

The top plate 46 is provided between the plate terminal 22c and the cap plate 20 on the electrode terminal 22, which is connected to the positive electrode 12. The top plate 46 is conductive and electrically connects the plate terminal 22c and the cap plate 20. That is, the cap plate 20 maintains an electrically connected state to the positive electrode 12 (e.g., the cap plate 20 is electrically connected to the positive electrode 12 of the electrode assembly 10).

The top plate 46 and the plate terminal 22c are fastened to an upper portion of the rivet terminal 22a by combining the top plate 46 and the plate terminal 22c to the upper portion of the rivet terminal 22a and riveting or welding the upper portion. The plate terminal 22c is installed outside the cap plate 20 on the top plate 46.

Gaskets 36 and 37 are respectively installed between the rivet terminals 21a and 22a of the electrode terminals 21 and 22 and the terminal openings H1 and H2 of the cap plate 20 to seal a space between the rivet terminals 21a and 22a and the cap plate 20 and to electrically insulate the same.

The gaskets 36 and 37 further extend between the flanges 21b and 22b and the cap plate 20 to further seal a space between the flanges 21b and 22b and the cap plate 20 and to electrically insulate the same. That is, the gaskets 36 and 37 prevent the electrolyte solution from leaking through a space between the terminal openings H1 and H2 and the electrode terminals 21 and 22.

Lead tabs 51 and 52 electrically connect the electrode terminals 21 and 22 to the negative electrode 11 and the positive electrode 12 of the electrode assembly 10, respectively. For example, the lead tabs 51 and 52 are combined to lower portions of the rivet terminals 21a and 22a to caulk the lower portions so that the lead tabs 51 and 52 are supported by the flanges 21b and 22b and are connected to the lower portions of the rivet terminals 21a and 22a.

Insulating members 61 and 62 are respectively installed between the lead tabs 51 and 52 and the cap plate 20 to electrically insulate the lead tabs 51 and 52 from the cap plate 20. Further, a first side (e.g., an upper side) of the insulating members 61 and 62 are combined to the cap plate 20 and respectively wrap or surround the lead tabs 51 and 52, the rivet terminals 21a and 22a, and the flanges 21b and 22b at a second side thereof, thereby stabilizing their connection structure.

The vent opening 24 is closed and sealed by a vent plate 25 and is configured to selectively discharge gas generated by the rechargeable battery. When the internal pressure of the rechargeable battery reaches a certain pressure (e.g., a predetermined pressure), the vent plate 25 ruptures to open the vent opening 24. The vent plate 25 may have a notch 25a for inducing the rupture at the certain pressure.

In one embodiment, a plurality of rechargeable batteries may be connected to each other and then used as a battery module. In this embodiment, the rechargeable batteries may be connected to each other by a bus bar. Respective ends of the bus bar may be combined to electrode terminals of the neighboring rechargeable batteries (e.g., the bus bar may connect adjacent ones of the rechargeable batteries).

The bus bar and the electrode terminals may be combined to each other through welding. The above-described bus bar may be a bus bar included in a battery module and, accordingly, a detailed description thereof may not be provided.

Regarding the above-described rechargeable battery according to an exemplary embodiment, a surface of an element of the first and/or second electrode terminal 21 and 22 and/or the top plate 46 has a slanted side (C) at a lower surface thereof facing the cap plate 20.

Figure 3:
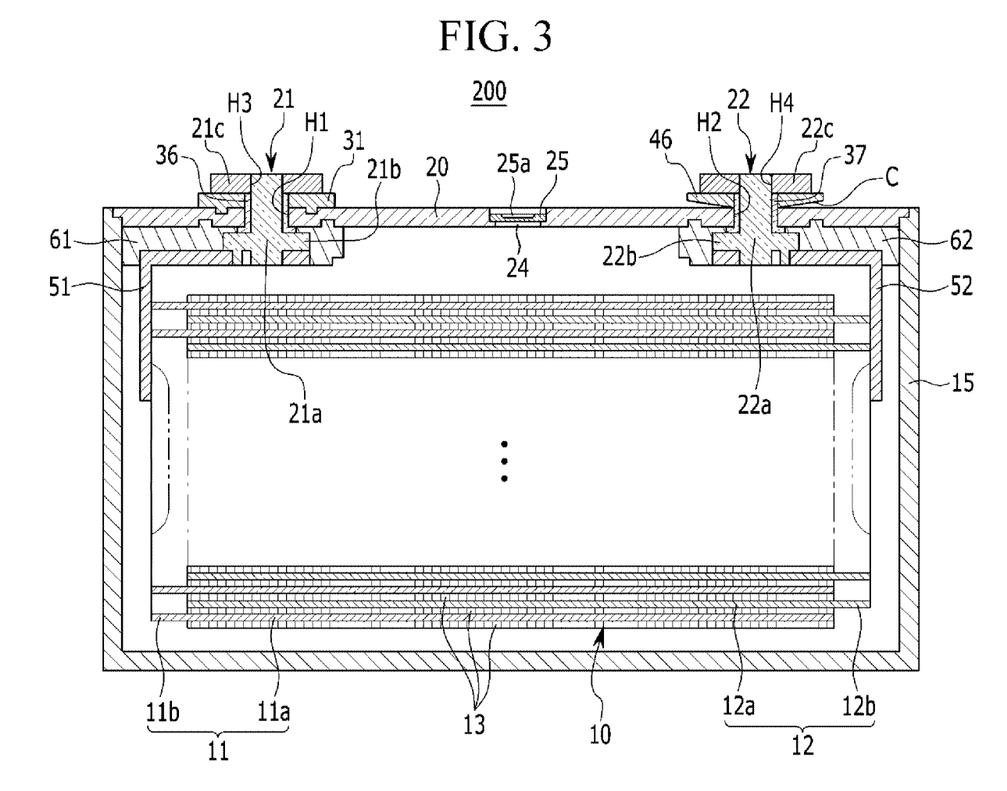
FIG. 3 shows a cross-sectional view of a rechargeable battery according to a second exemplary embodiment.

In one embodiment, as shown in FIG. 2, the plate terminal 22c of the electrode terminal 22 has the slanted side (C) on the lower side thereof. In another embodiment, as shown in FIG. 3, the top plate 46 has the slanted side (C) at the lower side thereof. While the slanted side (C) is shown, in FIG. 2 and FIG. 3, to be formed on an element of the electrode terminal 22, the slanted side may be formed on an element of the electrode terminal 21.

Figure 4:
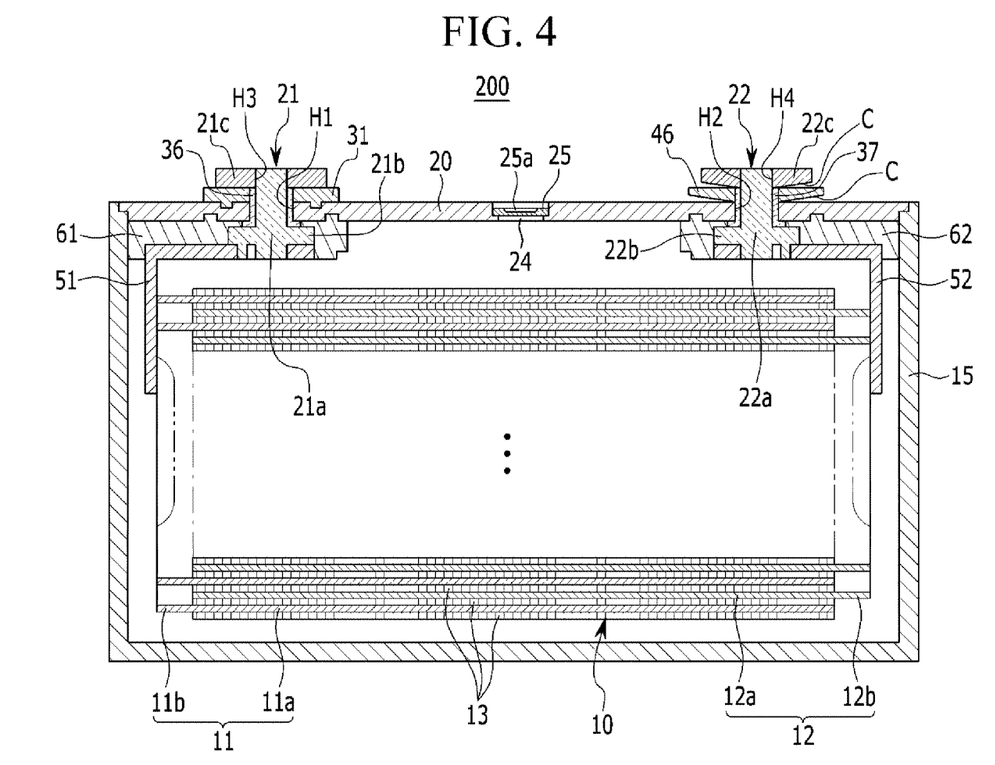
FIG. 4 shows a cross-sectional view of a rechargeable battery according to a third exemplary embodiment.

In yet another embodiment, as shown in FIG. 4, both the plate terminal 22c and the top plate 46 have a slanted side (C) at the lower sides thereof.

The slanted side (C) may be formed to be further upward as it becomes distant from a center of the top plate 46 or the electrode terminal 22. For example, when the slanted side (C) is at the lower side of the top plate 46, the top plate 46 may become gradually thinner along a direction from the center thereof to an outer end thereof.

The electrode assembly 10 may swell. Two neighboring rechargeable batteries may be moved relative to each other due to the swelling.

In the rechargeable battery according to an exemplary embodiment (e.g., 100, refer to FIG. 2), the slanted side (C) is at the lower side of the electrode terminal 22 (e.g., the slanted side (C) is on a lower side of an element of the electrode terminal 22 facing the cap plate 20). Therefore, when an external force is applied to the electrode terminal 22 due to, for example, movement of the rechargeable battery 100, the external force may apply a downward force to the electrode terminal 22 (e.g., may pressurize the electrode terminal 22 downward) and the top plate 46 may be bent toward the slanted side (C).

Figure 5:
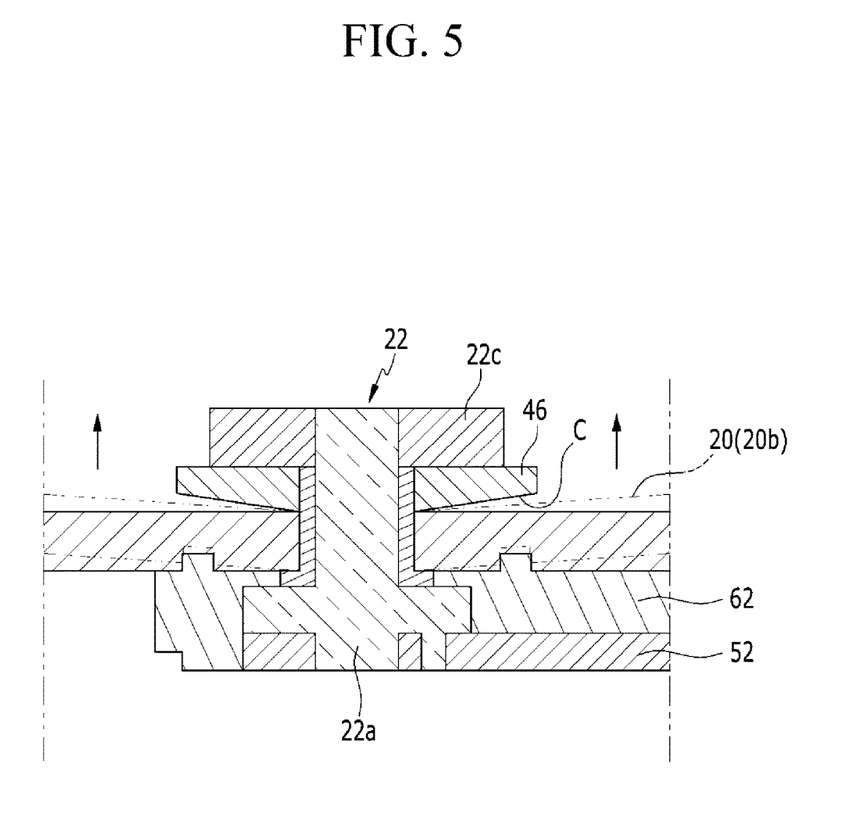
FIG. 5 shows a process in which a cap plate of the rechargeable battery shown in FIG. 3 deforms.

FIG. 5 shows a process in which a cap plate of the rechargeable battery shown in FIG. 3 deforms.

As shown in FIG. 5, when the external force is applied to the electrode terminal 22 due to the fine relative movement of the rechargeable batteries, the cap plate 20 may be bent toward the slanted side (C) (e.g., may be bent upward) because the slanted side (C) is formed on the top plate 46. Thus, the cap plate 20 may be deformed into a bent shape 20b from its original, flat shape.

As described above, regarding the rechargeable battery (e.g., 200, refer to FIG. 3) according to an exemplary embodiment, when the electrode assembly 10 swells and the rechargeable battery moves in a fine manner, the top plate 46 or the cap plate 20 may be deformed to neighbor (e.g., to be closer to or to contact) the slanted side (C).

For example, the cap plate 20 and the top plate 46 are configured to be deformed by the external force so the rechargeable battery according to an exemplary embodiment may prevent excessive stress to be generated in the welded portion of the bus bar and the electrode terminal 22 due to the swelling.

Figure 6:
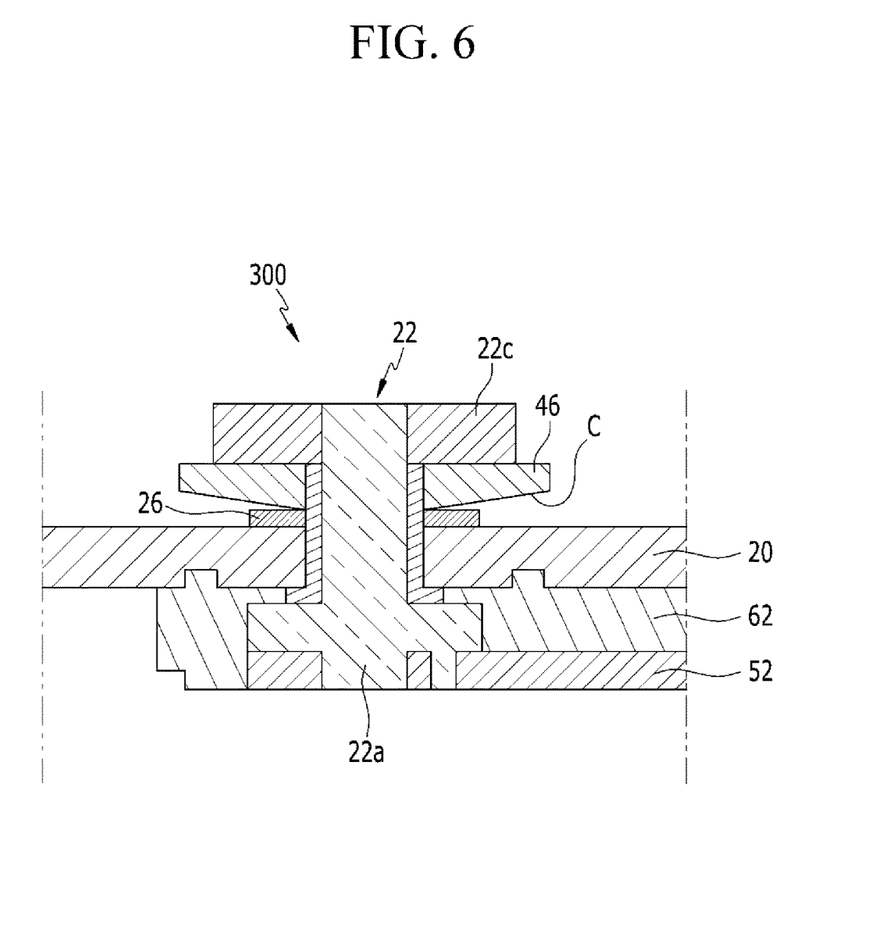
FIG. 6 shows a partially enlarged portion of a rechargeable battery according to a fourth exemplary embodiment.

FIG. 6 shows a partially enlarged portion of a rechargeable battery according to a fourth exemplary embodiment.

Referring to FIG. 6, a rechargeable battery 300 may further include a compressed and deformed member 26.

The compressed and deformed member 26 may be provided between the top plate 46 and the electrode terminal 22 or between the top plate 46 and the cap plate 20. The compressed and deformed member 26 may be compressed by the external force.

For example, the top plate 46 may pressurize the compressed and deformed member 26 due to the movement of the bus bar, and the top plate 46 may move or deform further downward as the compressed and deformed member 26 is compressed and deformed. For example, a movement range of the top plate 46 may be increased due to the compressed and deformed member 26.

The compressed and deformed member 26 may be made of, for example, conductive rubber, conductive silicone, or lead. In consideration of the environment, the conductive silicone or the conductive rubber may be used. However, the material of the compressed and deformed member 26 is not limited to the conductive rubber, the conductive silicone, and lead, and any suitable material that is conductive and easily deformable may be used.

The rechargeable battery 300 including the above-described compressed and deformed member 26 may accommodate further movement of the bus bar compared to the previous-described embodiments of the rechargeable battery (e.g., 100, refer to FIG. 2).

The drawings referred to above and the detailed description of embodiments of the present invention, provided as examples of the present invention, are used to explain the present invention and not limit meanings or the scope of the present invention described in claims. Therefore, those skilled in the art should understand that various modifications and other equivalent exemplary embodiments can be possible. Therefore, the technical protection scope of the present invention should be determined by the spirit described in the claims and their equivalents.

What is claimed is:

1. A rechargeable battery comprising:
a case accommodating an electrode assembly;
a cap plate coupled to the case at an opening thereof;
an electrode terminal electrically connected to the electrode assembly and on the cap plate, the electrode terminal comprising a terminal extending through an opening in the cap plate and a plate terminal electrically coupled to the terminal outside of the case;
a gasket between the cap plate and the terminal in the opening in the cap plate; and
a top plate between the plate terminal and the cap plate, the top plate electrically connecting the plate terminal to the cap plate, wherein the top plate and/or the plate terminal has a slanted side at a lower side thereof facing the cap plate.

2. The rechargeable battery of claim 1, wherein the slanted side of the top plate and/or the plate terminal is inclined upward along a direction away from a center of the top plate or the plate terminal.

3. The rechargeable battery of claim 1, further comprising a compressed and deformed member between the top plate and the plate terminal or between the top plate and the cap plate.

4. The rechargeable battery of claim 3, wherein the compressed and deformed member comprises conductive rubber, conductive silicone, or lead.

5. The rechargeable battery of claim 3, wherein the compressed and deformed member has a ring shape.

6. The rechargeable battery of claim 1, wherein the slanted side is formed at a lower surface of the top plate and/or the plate terminal and is included with respect to an upper surface of the cap plate.

* * * * *